United States Patent
Qi et al.

(10) Patent No.: US 10,588,169 B2
(45) Date of Patent: *Mar. 10, 2020

(54) MECHANISM TO ENABLE REJECTION AND CANCELLATION OF REQUEST ACTIONS FROM WIRELESS PEER-TO-PEER DEVICES

(71) Applicant: Intel Corporation, Santa Clara, CA (US)

(72) Inventors: Emily Qi, Gig Harbor, WA (US); Venkata Vallabhu, Portland, OR (US); Rita Lee, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/032,717

(22) Filed: Jul. 11, 2018

(65) Prior Publication Data

US 2019/0045563 A1 Feb. 7, 2019

Related U.S. Application Data

(63) Continuation of application No. 15/276,392, filed on Sep. 26, 2016, now Pat. No. 10,028,322, which is a
(Continued)

(51) Int. Cl.
*H04W 76/14* (2018.01)
*H04L 29/08* (2006.01)
(Continued)

(52) U.S. Cl.
CPC ............ *H04W 76/14* (2018.02); *H04L 12/66* (2013.01); *H04L 67/104* (2013.01);
(Continued)

(58) Field of Classification Search
CPC ... H04L 12/66; H04L 67/104; H04L 67/1063; H04L 67/1061; H04W 76/14;
(Continued)

(56) References Cited

U.S. PATENT DOCUMENTS 10,028,322 B2 7/2018 Qi
2006/0069800 A1* 3/2006 Li .................... H04L 65/4084
709/232

(Continued)

OTHER PUBLICATIONS

"U.S. Appl. No. 13/839,323, Advisory Action dated Dec. 2, 2015", 5 pgs.
(Continued)

*Primary Examiner* — Faruk Hamza
*Assistant Examiner* — Jean F Voltaire
(74) *Attorney, Agent, or Firm* — Schwegman Lundberg & Woessner, P.A.

(57) ABSTRACT

Systems, apparatuses, and methods are directed to a first peer-to-peer (P2P) enabled device configured to wirelessly transmit a first request message and a second P2P-enabled device configured to wirelessly receive the first request message. In response to receiving the first request message, the second P2P-enabled device wirelessly transmits a second request message to the first P2P-enabled device, and if the first request message is rejected by the second P2P-enabled device, the second request message includes status control information indicating that the first request message is rejected. In addition, if the first request message is to be cancelled, the first P2P-enabled device transmits another request message to the second P2P-enabled device with status control information indicating that the first request message has been cancelled.

19 Claims, 3 Drawing Sheets

Related U.S. Application Data continuation of application No. 14/964,682, filed on Dec. 10, 2015, now abandoned, which is a continuation of application No. 13/839,323, filed on Mar. 15, 2013, now abandoned.

(60) Provisional application No. 61/721,837, filed on Nov. 2, 2012.

(51) Int. Cl.
　　*H04L 12/66*　　(2006.01)
　　*H04W 76/18*　　(2018.01)
　　*H04W 60/00*　　(2009.01)
　　*H04W 88/06*　　(2009.01)
　　*H04W 84/12*　　(2009.01)

(52) U.S. Cl.
　　CPC ......... *H04L 67/1063* (2013.01); *H04W 76/18* (2018.02); *H04L 67/1061* (2013.01); *H04L 67/1072* (2013.01); *H04W 60/00* (2013.01); *H04W 84/12* (2013.01); *H04W 88/06* (2013.01)

(58) Field of Classification Search
　　CPC ....... H04W 4/02; H04W 76/18; H04W 60/00; H04W 84/12; H04W 88/06
　　USPC .......................................... 370/328
　　See application file for complete search history.

(56) References Cited

U.S. PATENT DOCUMENTS

| | | | |
|---|---|---|---|
| 2007/0104138 A1* | 5/2007 | Rudolf | H04W 72/0406 370/329 |
| 2008/0189429 A1* | 8/2008 | DaCosta | H04L 29/06027 709/231 |
| 2009/0290494 A1 | 11/2009 | Govindan et al. | |
| 2009/0323558 A1 | 12/2009 | Meenavalli | |
| 2010/0303039 A1 | 12/2010 | Zhang et al. | |
| 2011/0270932 A1 | 11/2011 | Chaturvedi et al. | |
| 2011/0292893 A1 | 12/2011 | Lee et al. | |
| 2012/0195320 A1* | 8/2012 | Yu | H04L 67/104 370/401 |
| 2012/0215851 A1* | 8/2012 | Wu | H04L 67/104 709/205 |
| 2012/0317204 A1* | 12/2012 | Lazaridis | H04L 63/0846 709/205 |
| 2013/0046841 A1* | 2/2013 | Park | H04W 4/08 709/206 |
| 2014/0057670 A1* | 2/2014 | Lim | H04W 8/005 455/509 |
| 2014/0126470 A1 | 5/2014 | Qi et al. | |
| 2016/0095149 A1 | 3/2016 | Qi et al. | |
| 2017/0013662 A1 | 1/2017 | Qi et al. | |

OTHER PUBLICATIONS

"U.S. Appl. No. 13/839,323, Final Office Action dated Jul. 31, 2015", 14 pgs.

"U.S. Appl. No. 13/839,323, Non Final Office Action dated Nov. 14, 2014", 11 pgs.

"U.S. Appl. No. 13/839,323, Response filed Apr. 9, 2015 to Non Final Office Action dated Nov. 14, 2014", 7 pgs.

"U.S. Appl. No. 13/839,323, Response filed Nov. 2, 2015 to Final Office Action dated Jul. 31, 2015", 9 pgs.

"U.S. Appl. No. 14/964,682, Final Office Action dated Sep. 22, 2016", 20 pgs.

"U.S. Appl. No. 14/964,682, Non Final Office Action dated Feb. 23, 2016", 19 pgs.

"U.S. Appl. No. 14/964,682, Response filed Jun. 20, 2016 to Non Final Office Action dated Feb. 23, 2016", 9 pgs.

"U.S. Appl. No. 15/276,392, Examiner Interview Summary dated Nov. 6, 2017", 3 pgs.

"U.S. Appl. No. 15/276,392, Examiner Interview Summary dated Dec. 1, 2017", 3 pgs.

"U.S. Appl. No. 15/276,392, Final Office Action dated Oct. 4, 2017", 18 pgs.

"U.S. Appl. No. 15/276,392, Non Final Office Action dated Mar. 23, 2017", 16 pgs.

"U.S. Appl. No. 15/276,392, Notice of Allowance dated Mar. 16, 2018", 14 pgs.

"U.S. Appl. No. 15/276,392, Preliminary Amendment filed Sep. 27, 2016", 9 pgs.

"U.S. Appl. No. 15/276,392, Response filed Jan. 4, 2018 to Final Office Action dated Oct. 4, 2017", 12 pgs.

"U.S. Appl. No. 15/276,392, Response filed Jul. 24, 2017 to Non Final Office Action dated Jul. 24, 2017", 14 pgs.

U.S. Appl. No. 13/839,323, filed Mar. 15, 2013, Mechanism to Enable Rejection and Cancellation of Request Actions From Wireless Peer-To-Peer Devices.

U.S. Appl. No. 14/964,682, filed Dec. 10, 2015, Mechanism to Enable Rejection and Cancellation of Request Actions From Wireless Peer-To-Peer Devices.

U.S. Appl. No. 15/276,392, filed Sep. 26, 2016, Mechanism to Enable Rejection and Cancellation of Request Actions From Wireless Peer-to-Peer Devices, U.S. Pat. No. 10,028,322.

* cited by examiner

MECHANISM TO ENABLE REJECTION AND CANCELLATION OF REQUEST ACTIONS FROM WIRELESS PEER-TO-PEER DEVICES

CROSS-REFERENCE TO RELATED APPLICATIONS

This application is continuation of and claims priority from U.S. patent application Ser. No. 13/839,323, filed on Mar. 15, 2013, which claims priority to U.S. Provisional application No. 61/721,837, filed on Nov. 2, 2012, all of which applications are incorporated herein by reference in their entireties.

TECHNICAL FIELD

This disclosure relates generally to the field of wireless communications, and in particular, to peer-to-peer wireless systems and methods.

BACKGROUND ART

Traditionally, wireless communication systems have employed a centralized control architecture. That is, devices serviced by such systems operate under the supervision of, as well as communicate directly with, a network controller that regulates the control information, messaging transactions, and timing to achieve the necessary endpoint-to-endpoint connectivity. In particular, the messaging transaction and control information are routed directly to the network controller to ensure centralized control of communications between the devices.

Recently, wireless communication systems having decentralized architectures, such as peer-to-peer (P2P) networks, have gained much interest given their level of flexibility and user convenience. In wireless P2P networks, wireless devices may establish connectivity and communicate directly with each other without having to route messages or control information through a centralized network controller. Such wireless P2P connectivity to allow users to connect devices in an easy and convenient manner and enable users to share, show, print, and synchronize content.

However, for various transactions, wireless P2P networks may lack certain control measures that affect message transfer efficiencies and, ultimately, overall communications.

DETAILED DESCRIPTION

Figure 1:
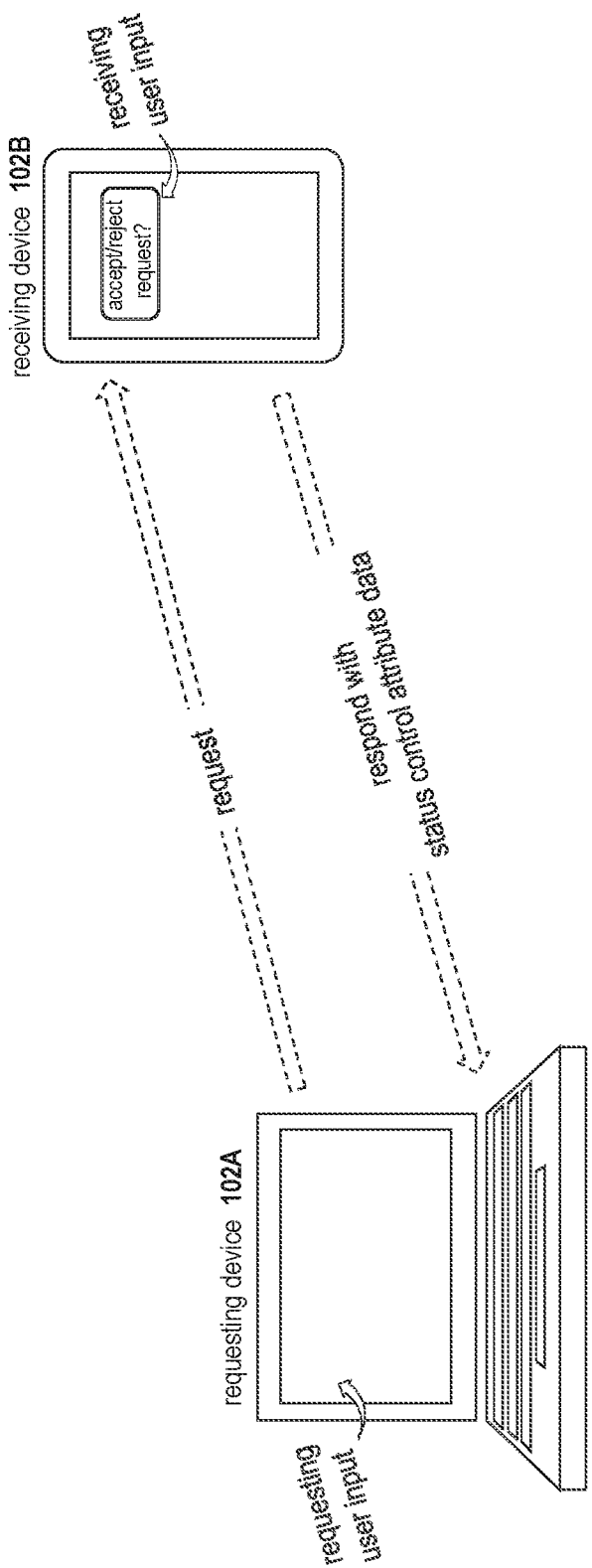
FIG. 1 depicts an overview of a wireless peer-to-peer system, in accordance with various aspects and principles of the present disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In accordance with various embodiments of this disclosure, what is proposed is a system and method directed to a first peer-to-peer (P2P) enabled device configured to wirelessly transmit a first request message and a second P2P-enabled device configured to wirelessly receive the first request message. In response to receiving the first request message, the second P2P-enabled device wirelessly transmits a second request message to the first P2P-enabled device, and if the first request message is rejected by the second P2P-enabled device, the second request message includes status control information indicating that the first request message is rejected.

Moreover, if the first request message is to be cancelled, the first P2P-enabled device transmits another request message to the second. P2P-enabled device with status control information indicating that the first request message has been cancelled.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

With regard to wireless P2P networks, the inventors have observed certain drawbacks in P2P transactions that require user intervention. For example, transactions requesting P2P-enabled devices to join a P2P network will require user input after a request notification, advising the user of the invitation, is received by the user. Other transactions requiring user input may include provision requests, negotiation requests, connection requests, etc. However, there is no mechanism for a receiving P2P device to reject such requests that are initiated by a requesting P2P device. Nor is there a mechanism for a requesting P2P device to cancel its invitation to a receiving P2P device to join the network.

These drawbacks may affect the transfer efficiency of the P2P devices. For example, in some wireless P2P systems, the requesting P2P device has to wait for a certain timeout period (e.g., 120 sec.) in the channel before determining whether the invitation is successful or not. Given that the requesting P2P device may also have other concurrent operations that need to be executed, waiting for such a timeout period compromises overall efficiency. Moreover, different applications may have their own timing constraints, so such a timeout period may further impact overall efficiency. In addition, the inability for a requesting P2P device to cancel its invitation may further exacerbate such efficiency issues, as the requesting P2P would have to wait for the transactional cycle including the timeout period, even though it no longer has an interest in sustaining the invitation.

Therefore, what is proposed is a P2P system, apparatus, and method that employs a status control mechanism that enables the rejection and/or cancellation of P2P message requests requiring user input. In this manner, the efficiency of message transfers may be significantly improved by avoiding any delays and timeouts in rejecting and cancelling such requests.

With this said, FIG. 1 depicts an overview of wireless peer-to-peer (P2P) system 100, in accordance with various aspects and principles of the present disclosure. The architecture of system 100 comprises wireless P2P-enabled device 102A and wireless P2P-enabled device 102B which are configured to wirelessly communicate directly each other via a wireless P2P networking protocol. For purposes of clarity, the embodiment of system 100 is depicted with wireless P2P-enabled device 102A configured as the "requesting" device while wireless P2P-enabled device 102B is configured as the "receiving" device. This is not intended to be limiting in any way, as the "requesting" and "receiving" functionality may easily be swapped among devices 102A and 102B, in accordance with the principles of the present disclosure.

The phrase "wireless P2P network" and "wireless P2P networking protocol" refers to a network that enables devices to communicate directly with each other via wireless signals in a decentralized peer-to-peer manner. Such networks may operate in accordance with one or more of the following standards or specifications and subsequent revisions as well as other standards for wireless networking: ANSI/IEEE 802.11 Standard for Information technology-Telecommunications and information exchange between systems-Local and metropolitan area networks, and its associated group of standards, such as for example Part 11: Wireless LAN Medium Access Control (MAC) and Physical Layer (PHY) Specifications, Amendment 1 to Part 11, Amendment 3 to Part 11, P802.11u/D.8.0 Draft Standard, P802.11.v/7.0 Draft Standard, Wi-Fi Alliance WMM™ Specification (including WMM™ Power Save) Specification version 1.1, Wi-Fi Alliance Technical Committee P2P Task Group WiFi Peer-to-Peer (P2P) Technical Specification version 1.0, and others.

The phrase "wireless P2P device" refers to any device that may communicate with other devices via wireless signals in accordance with a peer-to-peer network, as discussed above. Wireless P2P devices may, therefore include the necessary circuitry, hardware, firmware, and software or any combination thereof to effect wireless P2P communications. Such devices may comprise, for example, a laptop, mobile device, cellular/smartphone, gaming device, tablet computer, a wireless-enabled patient monitoring device, personal communication system (PCS) device, personal digital assistant (PDA), personal audio device (PAD), portable navigational device, and/or any other electronic wireless-enabled device configured to receive a wireless signal. As such, wireless P2P devices may be configured with variety of components, such as, for example, processor(s), memories, display screen, camera, input devices as well as communication-based elements. The communication-based elements may include, for example, antenna, interfaces, transceivers, modulation/demodulation and other circuitry, configured to wirelessly communicate and transmit/receive information. Wireless P2P devices may also include a bus infrastructure and/or other interconnection means to connect and communicate information between various components and communication elements noted above:

The processor(s) of the wireless P2P devices may be part of a core processing or computing unit that is configured to receive and process input data and instructions, provide output and/or control other components of the wireless P2P devices in accordance with embodiments of the present disclosure. Such processing elements may include a microprocessor, a memory controller, a memory and other components. The microprocessor may further include a cache memory (e.g., SRAM), which along with the memory may be part of a memory hierarchy to store instructions and data. The microprocessor may also include one or more logic modules such as a field programmable gate array (FPGA) or other logic array.

The memory of the wireless P2P devices may take the form of a dynamic storage device coupled to the bus infrastructure and configured to store information, instructions, and application programs to be executed by the processor(s) or controller(s) associated of the wireless P2P devices. Some or all of the memory may be implemented as Dual In-line Memory Modules (DIMMs), and may be one or more of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (REDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device. Wireless P2P devices may also include read only memory (ROM) and/or other static storage devices coupled to the bus infrastructure and configured to store static information and instructions for the processor(s) and/or controller(s) associated with the wireless P2P devices.

Returning to FIG. 1, a user (i.e., "requesting user") initiates a request intended for another user (i.e., "receiving user"). The request is inputted in requesting wireless P2P-enabled device 102A which generates and wirelessly transmits a request message to receiving P2P-enabled device 102B. In certain embodiments, the request message may take the form of an invitation request frame in which requesting wireless P2P-enabled device 102A invites receiving P2P-enabled device 102B to associate with the P2P network. However, the invitation request message form is not intended to be limiting, as the requested message may equally take the form of any request message that necessitates user input on the receiver side to effect a response to the request message, such as, for example, provisioning request messages, negotiation request messages, connection request messages, etc., in accordance with the various aspects of present disclosure, As shown in FIG. 1, after the receiving user receives the request message, the user inputs his response, either acceptance or rejection, into receiving P2P-enabled device 102B. In turn, receiving P2P-enabled device 102B generates and wirelessly transmits a responsive message back to requesting wireless P2P-enabled device 102A regarding the acceptance or rejection of the request. As will be described in further detail below, the responsive message also includes a status attribute control mechanism that contains codes to expedite the processing of the message transaction, such as, the rejection and cancellation of P2P message requests, resulting in the increase of overall efficiency.

Figure 2:
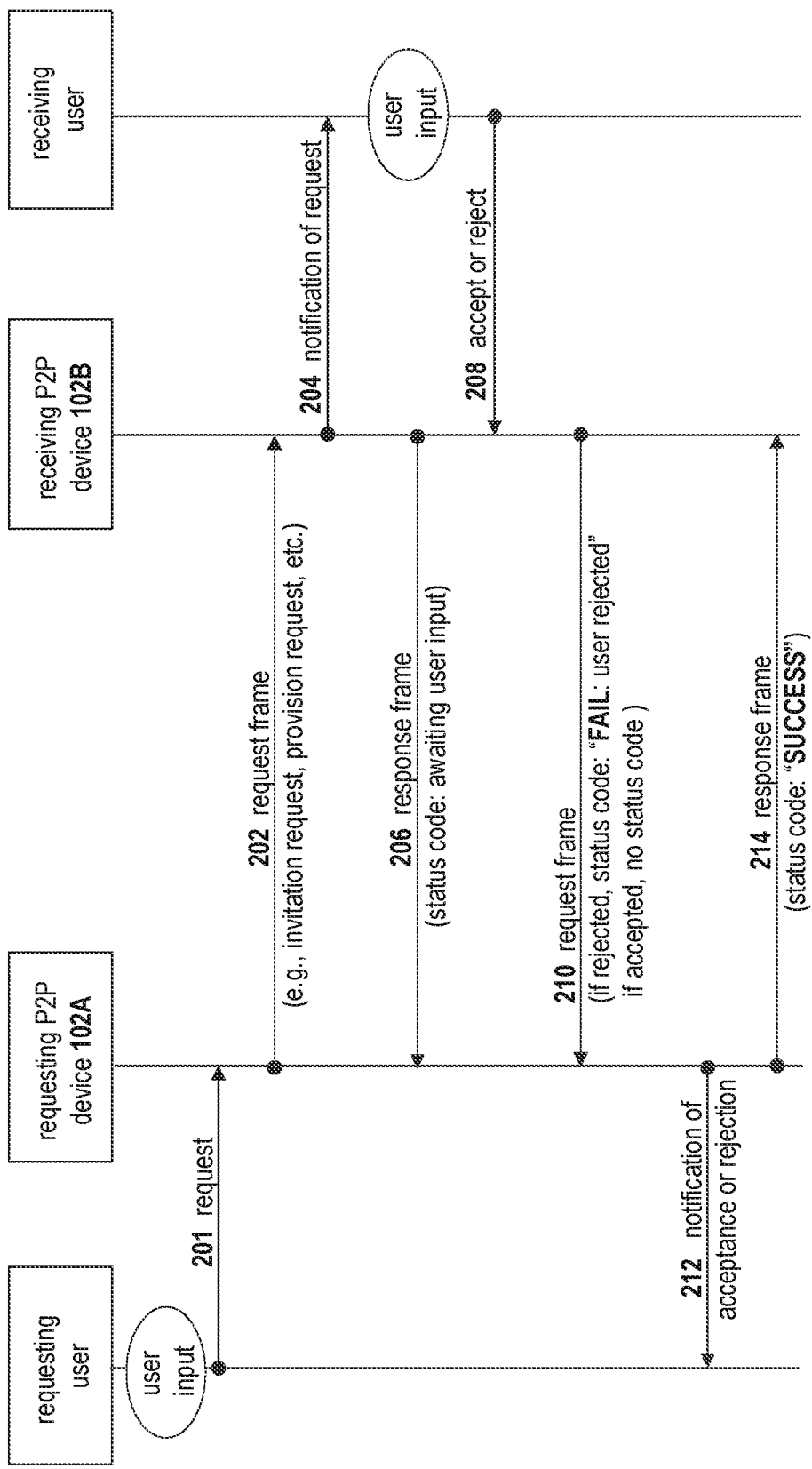
FIG. 2 depicts a message flow diagram illustrating an exemplary process for a wireless peer-to-peer system, in accordance with various aspects and principles of the present disclosure.

To this end, FIG. 2 depicts a detailed message flow diagram illustrating exemplary process 200 for wireless P2P system 100, in accordance with various aspects and principles of the present disclosure. Process 200 is represented as a transactional message flow diagram illustrating transactional messages in the form of frames between requesting wireless P2P-enabled device 102A and receiving P2P-enabled device 102B. In the illustrated embodiment, process 200 employs status code control attribute information configured to provide an indication of the status of a user response to an initial request.

Initially, requesting user inputs a request into requesting wireless P2P-enabled device 102A, as noted by message 201. Requesting wireless P2P-enabled device 102A then generates and wirelessly transmits a request frame, in accordance with the requesting user's request, at message 202. For sake of clarity, the request frame is represented as an invitation request frame, although the request frame may equally be represented by a variety of request messages, such as an invitation request message, provisioning request message, negotiation request message, connection request message, etc., as noted above.

Upon receipt of the invitation request frame, receiving P2P-enabled device 102B transmits a notification of the request to receiving user, as shown by message 204. The notification is passed on to a higher protocol stack layer of receiving P2P-enabled device 102B, which is then processed to generate an alert message, such as a pop-up window, dialog box, alarm, or any other suitable means for notifying the user of the invitation request and allowing the entry of user input.

Meanwhile, at message 206, receiving P2P-enabled device 102B transmits a response frame to requesting wireless P2P-enabled device 102A with a status code indicating it has receive the invitation request frame and that it is awaiting the "user input" to the invitation request frame.

The receiving user enters his response regarding the acceptance/rejection of the invitation request, which is presented to receiving P2P-enabled device 102B, at message 208. The higher layers of receiving P2P-enabled device 102B subsequently generate a request frame containing status code control attribute information and P2P-enabled device 102B then transmits the generated request frame to requesting wireless P2P-enabled device 102A, at message 210.

It will be appreciated that the status code control attribute information is configured with information that provides an indication of the status of the response to the initial invitation request. In certain embodiments, if the user input response is to reject the invitation request (i.e., "reject"), receiving P2P-enabled device 102B generates and transmits a request frame with a status control attribute information having the status code field set to "FAIL: user rejected".

On the other hand, if the user input response is to accept the invitation (i.e., "accept"), receiving P2P-enabled device 102B generates and transmits a request frame without any status control attribute information. In addition, if no response is received from the higher layers (i.e., user), the receiving P2P-enabled device 102B will do nothing and the requesting P2P device 1029 will timeout.

Returning to FIG. 2, after receiving the request frame containing status code control attribute information from P2P-enabled device 102B, requesting wireless P2P-enabled device 102A forwards a notification of the acceptance or rejection of the request to the requesting user, at message 212. After which, at message 214, requesting wireless P2P-enabled device 102A forwards a response frame to receiving P2P-enabled device 102B with status control attribute information having the status code field set to "SUCCESS", indicating that the acceptance or rejection was successfully received.

In this manner, the requesting P2P device avoids the latency in having to wait for certain timeout periods in the channel before determining that the request rejected, as any rejection to the initial request by the receiving P2P device is presented to the requesting P2P device in due course.

Figure 3:
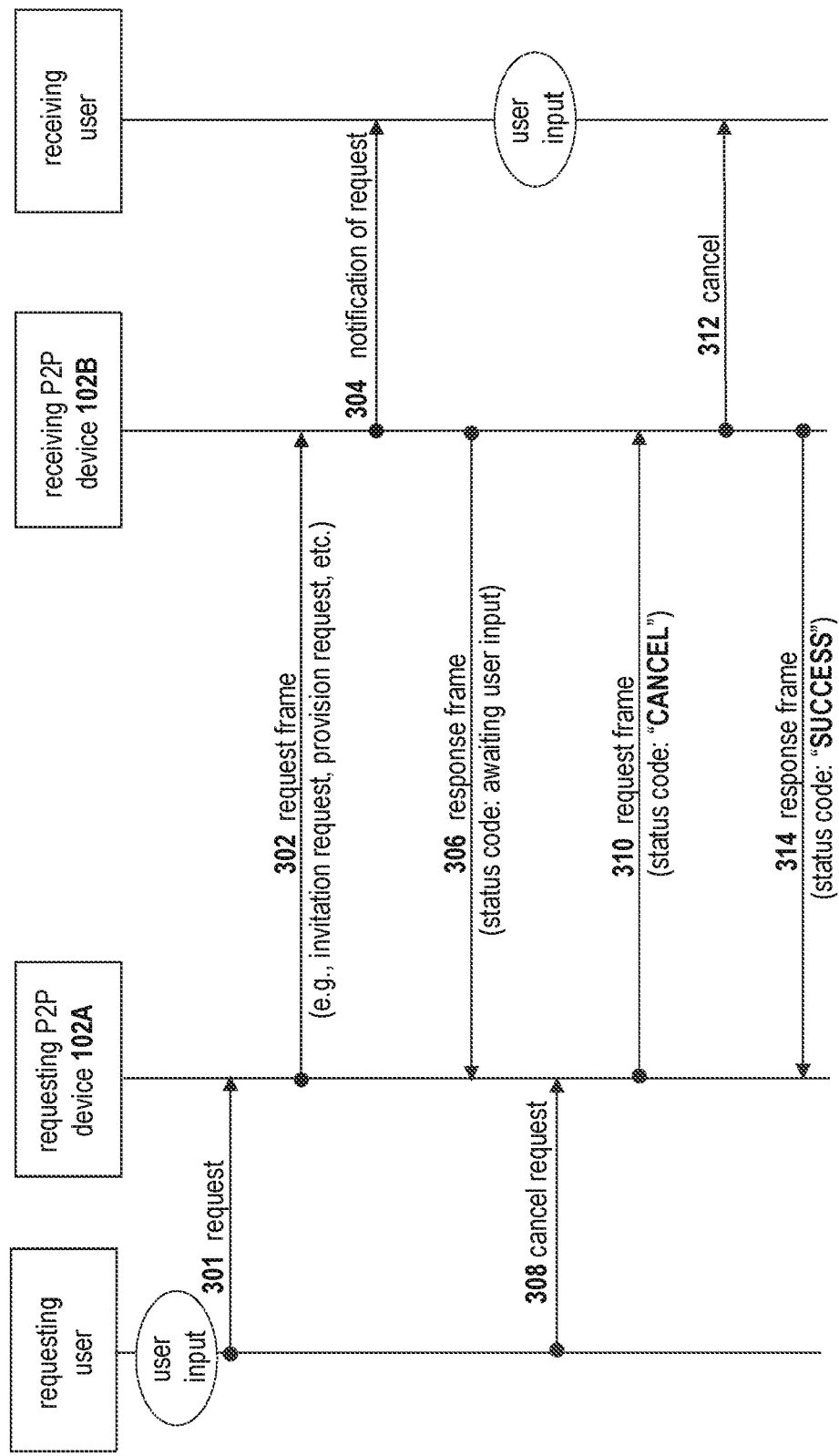
FIG. 3 depicts a message flow diagram illustrating an exemplary process for a wireless peer-to-peer system, in accordance with various aspects and principles of the present disclosure.

FIG. 3 depicts a detailed message flow diagram illustrating exemplary process 300 for wireless P2P system 100, in accordance with various aspects and principles of the present disclosure. Like process 200, process 300 is represented as a transactional message flow diagram illustrating transactional messages in the form of frames between requesting wireless P2P-enabled device 102A and receiving P2P-enabled device 102B. In the illustrated embodiment, process 300 employs status code control attribute information configured to provide an indication a request to cancel or abort a previously-submitted request.

Initially, requesting user inputs a request into requesting wireless P2P-enabled device 102A, as noted by message 301. Requesting wireless P2P-enabled device 102A then generates and transmits a request frame, in accordance with the requesting user's request, at message 302. Again, for the sake of tractability, the request frame is embodied as an invitation request frame, although the request frame may be directed to an invitation request message, provisioning request message, negotiation request message, connection request message, etc., as noted above.

Upon receipt of the invitation request frame, receiving P2P-enabled device 102B transmits a notification of the request to receiving user, as shown by message 304. The notification is passed on to a higher protocol stack layer of receiving P2P-enabled device 102B, which is then processed to generate an alert message, such as a pop-up window, dialog box, alarm, or any other suitable means for notifying the user of the invitation request and allowing the entry of user input.

Meanwhile, at message 306, receiving P2P-enabled device 102B transmits a response frame to requesting wireless P2P-enabled device 102A with a status code indicating that it is awaiting "user input" to the invitation request frame.

However, as depicted at message 308, the requesting user inputs a cancellation to abort the previously-submitted invitation request. In response, requesting wireless P2P-enabled device 102A generates a request frame containing status code control attribute information and transmits that request frame to receiving P2P-enabled device 102B, at message 310. In this case, the status code control attribute information is configured to provide an indication of a request to cancel the previously-submitted request. In particular, requesting wireless P2P-enabled device 102A generates and transmits a request frame with a status control attribute information having the status code field set to "CANCEL".

Upon receipt of the request frame with the "CANCEL" status code by receiving P2P-enabled device 102B, the CANCEL request frame is passed on to a higher protocol stack layer of receiving P2P-enabled device 102B, at message 312, which is then processed to generate an alert, such as a pop-up window, dialog box, alarm, or any other suitable means for notifying the user that the invitation request has been cancelled.

At message 314, receiving P2P-enabled device 1029 then forwards a response frame to requesting wireless P2P-enabled device 102A with status control attribute information having the status code field set to "SUCCESS", indicating that the cancellation was received and successful.

In this manner, the requesting P2P device is able to cancel a request that was previously submitted to receiving P2P device, thereby avoiding any delays in being forced to wait through the transaction processing cycles.

EXAMPLES

The following examples pertain to numerous embodiments, consistent with the various aspects and principles of the present disclosure.

Example 1 is a wireless system that includes a first peer-to-peer (P2P)-enabled device configured to wirelessly transmit a first request message containing a request requiring a response; and a second P2P-enabled device configured to wirelessly receive the first request message, wherein, upon receiving the first request message, the second P2P-enabled device wirelessly transmits a second request message to the first P2P-enabled device, and wherein, if the request contained in the first request message is rejected by the second P2P-enabled device, the second request message includes status control information indicating that the first request message is rejected.

In Example 2, the subject matter of Example 1 may optionally include that if the request contained in the first request message is accepted by the second P2P-enabled device, the second request message omits the status control information.

In Example 3, the subject matter of Example 1 may optionally include that prior to transmitting the second request message, the second P2P-enabled device transmits a first response message to indicate waiting of an input responsive to the request contained in the first request message.

In Example 4, the subject matter of Example 1 may optionally include that the first P2P-enabled device transmits a second response message to the second P2P-enabled device to indicate acknowledgement of the rejection of the request.

In Example 5, the subject matter of Example 1 may optionally include that the first P2P-enabled device transmits a second response message to the second P2P-enabled device to indicate acknowledgement of the acceptance of the request.

Example 6 is a wireless system that includes a first peer-to-peer (P2P)-enabled device configured to wirelessly transmit a first request message containing a request requiring a response; and a second P2P-enabled device configured to wirelessly receive the first request message, wherein, upon receiving an input indicating that the first request message is to be cancelled, the first P2P-enabled device transmits a second request message to the second P2P-enabled device that includes status control information indicating that the first request has been cancelled.

In Example 7, the subject matter of Example 6 may optionally include that prior to transmitting the second request message, the second P2P-enabled device transmits a first response message to indicate waiting of an input responsive to the request contained in the first request message.

In Example 8, the subject matter of Example 6 may optionally include that the second P2P-enabled device transmits a second response message to the first P2P-enabled device to indicate acknowledgement of the cancellation of the request.

Example 9 is a wireless method that provides wirelessly transmitting a first request message by a first peer-to-peer (P2P) enabled device, the request message containing a request requiting a response; wirelessly receiving the first request message by a second P2P-enabled device; and wirelessly transmitting a second request message by the second P2P-enabled device to the first P2P-enabled device, in response to receiving the first request message, wherein, if the request contained in the first request message is rejected by the second P2P-enabled device, the second request message includes status control information indicating that the first request message is rejected.

In Example 10, the subject matter of Example 9 may optionally provide that if the request contained in the first request message is accepted by the second P2P-enabled device, the second request message omits the status control information.

In Example 11, the subject matter of Example 9 may optionally provide that prior to transmitting the second request message, transmitting, by the second P2P-enabled device, a first response message to indicate waiting of an input responsive to the request contained in the first request message.

In Example 12, the subject matter of Example 9 may optionally provide transmitting, by the first P2P-enabled device, a second response message to the second P2P-enabled device to indicate acknowledgement of the rejection of the request.

In Example 13, the subject matter of Example 9 may optionally provide transmitting, by the first P2P-enabled device, a second response message to the second P2P-enabled device to indicate acknowledgement of the acceptance of the request.

Example 14 is a wireless method that provides wirelessly transmitting a first request message by a first peer-to-peer (P2P) enabled device, the request message containing a request requiring a response; wirelessly receiving the first request message by a second P2P-enabled device; and wherein, upon receiving an input indicating that the first request message is to be cancelled, transmitting, by the first P2P-enabled device, a second request message to the second P2P-enabled device that includes status control information indicating that the first request has been cancelled.

In Example 15, the subject matter of Example 14 may optionally provide that prior to transmitting the second request message, transmitting, by the second P2P-enabled device, a first response message to indicate waiting of an input responsive to the request contained in the first request message.

In Example 16, the subject matter of Example 14 may optionally provide transmitting, by the second P2P-enabled device, a second response message to the first P2P-enabled device to indicate acknowledgement of the cancellation of the request.

Example 17 is a computer-readable medium comprising computer-readable instructions physically embodied thereon which, when executed by a processor, causes the processor to perform a method comprising: wirelessly transmitting a first request message by a first peer-to-peer (P2P) enabled device, the request message containing a request requiring a response; wirelessly receiving the first request message by a second. P2P-enabled device; and wirelessly transmitting a second request message by the second P2P-enabled device to the first P2P-enabled device, in response to receiving the first request message, wherein, if the request contained in the first request message is rejected by the second P2P-enabled device, the second request message includes status control information indicating that the first request message is rejected.

In Example 18, the subject matter of Example 17 may optionally provide that if the request contained in the first request message is accepted by the second P2P-enabled device, the second request message omits the status control information.

In Example 19, the subject matter of Example 17 may optionally provide that prior to transmitting the second request message, transmitting, by the second P2P-enabled device, a first response message to indicate waiting of an input responsive to the request contained in the first request message.

In Example 20, the subject matter of Example 17 may optionally provide transmitting, by the first P2P-enabled device, a second response message to the second P2P-enabled device to indicate acknowledgement of the rejection of the request.

In Example 21, the subject matter of Example 17 may optionally provide transmitting, by the first P2P-enabled device, a second response message to the second P2P-enabled device to indicate acknowledgement of the acceptance of the request.

Example 22 is a computer-readable medium comprising computer-readable instructions physically embodied thereon which, when executed by a processor, causes the processor to perform a method comprising: wirelessly transmitting a first request message by a first peer-to-peer (P2P) enabled device, the request message containing a request requiring a response; wirelessly receiving the first request message by a second P2P-enabled device; and wherein, upon receiving an input indicating that the first request message is to be cancelled, transmitting, by the first P2P-enabled device, a second request message to the second P2P-enabled device that includes status control information indicating that the first request has been cancelled.

In Example 23, the subject matter of Example 22 may optionally provide that prior to transmitting the second request message, transmitting, by the second P2P-enabled device, a first response message to indicate waiting of an input responsive to the request contained in the first request message.

In Example 24, the subject matter of Example 22 may optionally provide transmitting, by the second P2P-enabled device, a second response message to the first P2P-enabled device to indicate acknowledgement of the cancellation of the request.

Example 25 is a wireless system that includes a first peer-to-peer (P2P)-enabled device configured to wirelessly transmit a first request message containing a request requiring a response; and a second P2P-enabled device configured to wirelessly receive the first request message, wherein, upon receiving the first request message, the second P2P-enabled device wirelessly transmits a second request message to the first P2P-enabled device, and wherein, if the request contained in the first request message is rejected by the second P2P-enabled device, the second request message includes status control information indicating that the first request message is rejected.

In Example 26, the subject matter of Example 25 may optionally include that if the request contained in the first request message is accepted by the second P2P-enabled device, the second request message omits the status control information.

In Example 27, the subject matter of Example 25 may optionally include that prior to transmitting the second request message, the second P2P-enabled device transmits a first response message to indicate waiting of an input responsive to the request contained in the first request message.

In Example 28, the subject matter of Example 25 may optionally include that the first P2P-enabled device transmits a second response message to the second P2P-enabled device to indicate acknowledgement of the rejection of the request.

In Example 29, the subject matter of Example 25 may optionally include that the first P2P-enabled device transmits a second response message to the second P2P-enabled device to indicate acknowledgement of the acceptance of the request.

Example 30 is a wireless system that includes a first peer-to-peer (P2P)-enabled device configured to wirelessly transmit a first request message containing a request requiring a response; and a second P2P-enabled device configured to wirelessly receive the first request message, wherein, upon receiving an input indicating that the first request message is to be cancelled, the first P2P-enabled device transmits a second request message to the second P2P-enabled device that includes status control information indicating that the first request has been cancelled.

In Example 31, the subject matter of Example 30 may optionally include that prior to transmitting the second request message, the second P2P-enabled device transmits a first response message to indicate waiting of an input responsive to the request contained in the first request message.

In Example 32, the subject matter of Example 30 may optionally include that the second P2P-enabled device transmits a second response message to the first P2P-enabled device to indicate acknowledgement of the cancellation of the request.

Example 33 is a wireless method that provides wirelessly transmitting a first request message by a first peer-to-peer (P2P) enabled device, the request message containing a request requiting a response; wirelessly receiving the first request message by a second P2P-enabled device; and wirelessly transmitting a second request message by the second P2P-enabled device to the first P2P-enabled device, in response to receiving the first request message, wherein, if the request contained in the first request message is rejected by the second P2P-enabled device, the second request message includes status control information indicating that the first request message is rejected.

In Example 34, the subject matter of Example 33 may optionally provide that if the request contained in the first request message is accepted by the second P2P-enabled device, the second request message omits the status control information.

In Example 35, the subject matter of Example 33 may optionally provide that prior to transmitting the second request message, transmitting, by the second P2P-enabled device, a first response message to indicate waiting of an input responsive to the request contained in the first request message.

In Example 36, the subject matter of Example 33 may optionally provide transmitting, by the first P2P-enabled device, a second response message to the second. P2P-enabled device to indicate acknowledgement of the rejection of the request.

In Example 37, the subject matter of Example 33 may optionally provide transmitting, by the first P2P-enabled device, a second response message to the second P2P-enabled device to indicate acknowledgement of the acceptance of the request.

Example 38 is a wireless method that provides wirelessly transmitting a first request message by a first peer-to-peer (P2P) enabled device, the request message containing a request requiring a response; wirelessly receiving the first request message by a second P2P-enabled device; and wherein, upon receiving an input indicating that the first request message is to be cancelled, transmitting, by the first P2P-enabled device, a second request message to the second P2P-enabled device that includes status control information indicating that the first request has been cancelled.

In Example 39, the subject matter of Example 38 may optionally provide that prior to transmitting the second request message, transmitting, by the second P2P-enabled device, a first response message to indicate waiting of an input responsive to the request contained in the first request message.

In Example 40, the subject matter of Example 38 may optionally provide transmitting, by the second P2P-enabled device, a second response message to the first P2P-enabled device to indicate acknowledgement of the cancellation of the request.

Example 41 is a computer-readable medium comprising computer-readable instructions physically embodied thereon which, when executed by a processor, causes the processor to perform a method comprising: wirelessly transmitting a first request message by a first peer-to-peer (P2P) enabled device, the request message containing a request requiring a response; wirelessly receiving the first request message by a second. P2P-enabled device; and wirelessly transmitting a second request message by the second P2P-enabled device to the first P2P-enabled device, in response to receiving the first request message, wherein, if the request contained in the first request message is rejected by the second P2P-enabled device, the second request message includes status control information indicating that the first request message is rejected.

In Example 42, the subject matter of Example 41 may optionally provide that if the request contained in the first request message is accepted by the second P2P-enabled device, the second request message omits the status control information.

In Example 43, the subject matter of Example 41 may optionally provide that prior to transmitting the second request message, transmitting, by the second P2P-enabled device, a first response message to indicate waiting of an input responsive to the request contained in the first request message.

In Example 44, the subject matter of Example 41 may optionally provide transmitting, by the first P2P-enabled device, a second response message to the second P2P-enabled device to indicate acknowledgement of the rejection of the request.

In Example 45, the subject matter of Example 41 may optionally provide transmitting, by the first P2P-enabled device, a second response message to the second P2P-enabled device to indicate acknowledgement of the acceptance of the request.

Example 46 is a computer-readable medium comprising computer-readable instructions physically embodied thereon which, when executed by a processor, causes the processor to perform a method comprising: wirelessly transmitting a first request message by a first peer-to-peer (P2P) enabled device, the request message containing a request requiring a response; wirelessly receiving the first request message by a second P2P-enabled device; and wherein, upon receiving an input indicating that the first request message is to be cancelled, transmitting, by the first P2P-enabled device, a second request message to the second P2P-enabled device that includes status control information indicating that the first request has been cancelled.

In Example 47, the subject matter of Example 46 may optionally provide that prior to transmitting the second request message, transmitting, by the second P2P-enabled device, a first response message to indicate waiting of an input responsive to the request contained in the first request message.

In Example 48, the subject matter of Example 46 may optionally provide transmitting, by the second P2P-enabled device, a second response message to the first P2P-enabled device to indicate acknowledgement of the cancellation of the request.

Example 49 is an apparatus comprising means for performing the method of claims 33-37.

Example 50 is an apparatus comprising means for performing the method of claims 39-40.

Example 51 is a computer-readable medium comprising computer-readable instructions physically embodied thereon which, when executed by a processor, causes the processor to perform the method of any of claims 33-37.

Example 52 is a computer-readable medium comprising computer-readable instructions physically embodied thereon which, when executed by a processor, causes the processor to perform the method of any of claims 39-40.

Having thus described the basic concepts, it will be rather apparent to those skilled in the art after reading this detailed disclosure that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure. In addition, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a micro-controller, or the like.

Furthermore, the recited order of processing elements or sequences, or the use of numbers, letters, or other designations therefore, is not intended to limit the claimed processes and methods to any order except as can be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, as the following claims reflect, inventive embodiments lie in less than all features of a single foregoing disclosed embodiment. Thus, the claims following the detailed description are hereby expressly incorporated into this detailed description.

What is claimed is:

1. An apparatus of wireless device configured for peer-to-peer (P2P) communication services with one or more other peer devices of a wireless local area network (WLAN), the apparatus comprising:
    memory; and
    processing circuitry, configured to:
        encode an initial provision request frame for transmission to a peer device in accordance with a P2P communication technique, the provision request frame being a request to set up a P2P connection with the peer device for services of the peer device;
        decode an initial provision response frame that indicates a deferral of the request contained in the initial provision request frame;
        decode a follow-on provision request frame to determine a status attribute indicator indicating acceptance of the request, the follow-on provision request frame being received by the wireless device in response to the initial provision request frame;
        encode data for utilization of the services of the peer device over the P2P connection in response to an acceptance of the request; and
        cancel the request prior to the decode of the follow-on provision request frame indicating the acceptance of the request,
    wherein the acceptance of the request is indicated when the follow-on provision request frame is received with the status attribute indicator indicating acceptance; and
    wherein the follow-on provision request frame indicates parameters for the P2P connection to allow the wireless device to encode data for utilization of the services of the peer device, the services comprising services to at least one of send, play, print, or display content.

2. The apparatus of claim 1 wherein the deferral of the request is indicated when the initial provision response frame is received with the status attribute indicator indicating deferral, and
    wherein in response to the deferral, the processing circuitry is configured to wait, for a timeout period, for the follow-on provision request frame from the peer device with the status attribute indicator indicating either success or failure.

3. The apparatus of claim 2 wherein the status attribute indicator of the follow-on provision request frame indicating success corresponds to an acceptance of the request by the peer device, and
    wherein the status attribute indicator of the follow-on provision request frame indicating failure corresponds to rejection of the request by the peer device.

4. The apparatus of claim 3 wherein in response to receipt of the follow-on provision request frame with the status attribute indicator indicating success, the processing circuitry is configured to encode a follow-on provision response frame for transmission to the peer device to confirm a set-up of the P2P connection.

5. The apparatus of claim 4 wherein a timeout failure is indicated if the follow-on provision request frame is not received within the timeout period.

6. The apparatus of claim 1, wherein to cancel the request, the processing circuitry is configured to encode a second provision request frame for transmission to the peer device to cancel the request and is to include a status attribute indicator indicating cancelation of the request.

7. The apparatus of claim 5 wherein the initial provision request frame is a request to set up a P2P connection with the peer device to form or join a P2P group.

8. The apparatus of claim 5 wherein the P2P communication technique is in accordance with a Wi-Fi Alliance Peer-to-Peer (P2P) Technical Specification, and
    wherein the wireless device is configured to communicate in accordance with an IEEE 802.11 standard.

9. The apparatus of claim 5 further comprising transceiver circuitry coupled to the processing circuitry, the transceiver circuitry configured to be coupled to one or more antenna, the transceiver configured to:
    transmit the initial provision request frame; and
    receive the provision request frame.

10. The apparatus of claim 1 wherein the memory is configured to store at least some of the parameters for the P2P connection.

11. A non-transitory computer-readable storage medium that stores instructions for execution by processing circuitry of a wireless device to configure the device for peer-to-peer (P2P) communication services with one or more other peer devices of a wireless local area network (WLAN), the processing circuitry configured to:
    encode an initial provision request frame for transmission to a peer device in accordance with a P2P communication technique, the provision request frame being a request to set up a P2P connection with the peer device for services of the peer device;
    decode an initial provision response frame that indicates a deferral of the request contained in the initial provision request frame;
    decode a follow-on provision request frame to determine a status attribute indicator indicating acceptance of the request, the follow-on provision request frame being received by the wireless device in response to the initial provision request frame;
    encode data for utilization of the services of the peer device over the P2P connection in response to an acceptance of the request; and
    cancel the request prior to the decode of the follow-on provision request frame indicating the acceptance of the request,
    wherein the acceptance of the request is indicated when the follow-on provision request frame is received with the status attribute indicator indicating acceptance; and
    wherein the follow-on provision request frame indicates parameters for the P2P connection to allow the wireless device to encode data for utilization of the services of the peer device, the services comprising services to at least one of send, play, print, or display content.

12. The computer-readable storage medium of claim 11 wherein the deferral of the request is indicated when the initial provision response frame is received with the status attribute indicator indicating deferral, and
    wherein in response to the deferral, the processing circuitry is configured to wait, for a timeout period, for the follow-on provision request frame from the peer device with the status attribute indicator indicating either success or failure.

13. The computer-readable storage medium of claim 12 wherein the status attribute indicator of the follow-on provision request frame indicating success corresponds to an acceptance of the request by the peer device, and wherein the status attribute indicator of the follow-on provision request frame indicating failure corresponds to rejection of the request by the peer device.

14. The computer-readable storage medium of claim 13 wherein in response to receipt of the follow-on provision request frame with the status attribute indicator indicating success, the processing circuitry is configured to encode a follow-on provision response frame for transmission to the peer device to confirm a set-up of the P2P connection.

15. The computer-readable storage medium of claim 14 wherein a timeout failure is indicated if the follow-on provision request frame is not received within the timeout period.

16. The computer-readable storage medium of claim 15 wherein the initial provision request frame is a request to set up a P2P connection with the peer device to form or join a P2P group, and wherein the P2P communication technique is in accordance with a Wi-Fi Alliance Peer-to-Peer (P2P) Technical Specification, and wherein the wireless device is configured to communicate in accordance with an IEEE 802.11 standard.

17. An apparatus of wireless device configured for peer-to-peer (P2P) communication services with one or more other peer devices of a wireless local area network (WLAN), the apparatus comprising:

memory; and processing circuitry, configured to:

decode an initial provision request frame received from a peer device in accordance with a P2P communication technique, the provision request frame being a request to set up a P2P connection with the peer device for services of the wireless device;

encode an initial provision response frame that indicates a deferral of the request contained in the initial provision request frame;

encode a follow-on provision request frame to indicate a status attribute indicator indicating acceptance of the request, the follow-on provision request frame for transmission to the wireless device in response to the initial provision request frame;

decode data from the peer device for utilization of the services advertised by the wireless device, the data received over the P2P connection if the request is accepted; and wherein the acceptance of the request is indicated when the follow-on provision request frame is transmitted with the status attribute indicator indicating acceptance; and wherein the follow-on provision request frame indicates parameters for the P2P connection to allow the peer device to decode data for utilization of the services of the wireless device, the services comprising services to at least one of send, play, print, or display content.

18. The apparatus of claim 17 wherein the processing circuitry is configured to indicate a deferral of the request by configuring the initial provision response frame with the status attribute indicator that indicates deferral; and encode for transmission within a timeout period, the follow-on provision request frame with the status attribute indicator indicating either success or failure.

19. The apparatus of claim 18 wherein a timeout failure results if the follow-on provision request frame is not transmitted within the timeout period.

* * * * *